United States Patent [19]

Edwards, Jr.

[11] Patent Number: 5,425,154

[45] Date of Patent: Jun. 20, 1995

[54] TRUCKER'S LEVERAGE BAR AND METHOD

[76] Inventor: George T. Edwards, Jr., 2718 Pecan Ridge Dr., Laurel, Miss. 39440

[21] Appl. No.: 110,709

[22] Filed: Aug. 23, 1993

[51] Int. Cl.6 .............................. B25G 1/04; B25G 3/04
[52] U.S. Cl. .............................. 16/111 R; 16/114 R; 74/543; 74/544; 74/546
[58] Field of Search .................... 16/111 R, 114 R; 74/543, 544, 546; 24/68 R, 68 CD, 68 CT, 71.2; 81/177.2

[56] References Cited

U.S. PATENT DOCUMENTS

| | | | |
|---|---|---|---|
| 3,657,944 | 4/1972 | Able | 16/114 R |
| 4,297,916 | 11/1981 | Burroughs | 16/114 R |
| 4,510,651 | 4/1985 | Prete, jr. et al. | 16/114 R |
| 4,873,742 | 10/1989 | Dillon | 16/111 R |

Primary Examiner—P. Austin Bradley
Assistant Examiner—Chuck Y. Mah
Attorney, Agent, or Firm—John W. Carpenter

[57] ABSTRACT

An improved leverage bar for use on a load binder handle or in the opening of a ratcheting binder comprising a bar having a latch assembly on a first end for engaging the load binder. The latch assembly comprises a generally U-shaped wall member with a latch member and a fulcrum member interposed therebetween. A second end of the bar comprises a rod assembly for engaging the opening of a ratcheting binder. The rod assembly comprises a first cylindrical section secured to a second cylindrical section which is smaller in diameter to the first cylindrical section and an conical end cap member secured to the second cylindrical section. A method for operating a ratcheting binder and a load binder, all such as those installed on a flat-bed trailer.

18 Claims, 9 Drawing Sheets

TRUCKER'S LEVERAGE BAR AND METHOD

FIELD OF THE INVENTION

The current invention relates to an improved leverage bar. More specifically, the present invention provides an improved leverage bar for engaging either a ratchet binder or a load binder; and method for operating a ratchet binder and a load binder for tightening chains with the former and tightening a belt with the load binder, all for securing articles to a flat-bed trailer.

BACKGROUND OF THE INVENTION

Leverage extensions for load binders are well know in the art. Common practice with load binders has been to couple a hollow pipe to a handle of the load binder to provide additional leverage for operating same, with the common result of either bending the pipe when the extra or additional leverage is attempted, or having the pipe slip off the handle of the load binder and cause significant injury and/or damage. Handles or leverage bars commonly used with ratchet binders are also often not designed to handle the amount of stress usually placed on them and subsequently break, usually causing unfortunate accidents. The rod provided by the present invention is primarily for ratchet binders and for a leverage extension for load binders (both which has caused injury to the operators) and address the previously unaddressed problems of insufficient design.

A patentability search was conducted and the following U.S. patents by numbers were found: U.S. Pat. No. 3,119,278 to Simpson; U.S. Pat. No. 3,314,315 to Scholl; U.S. Pat. No. 3,657,944 to Able; U.S. Pat. No. 3,843,981 to Verest; U.S. Pat. No. 4,644,600 to Fugate; and U.S. Pat. No. 4,873,742 to Dillon.

U.S. Pat. No. 3,119,278 to Simpson discloses a safety leverage extension for use with load binders. The leverage extension attaches to a load binder handle with a clevis and pin assembly.

U.S. Pat. No. 3,314,315 to Scholl is a safety lever with an angular shape. It is used in the place of a person's hand in breaking an oil seal on a rotary table.

U.S. Pat. No. 3,657,944 to Able teaches a detachable handle extension for a chain tightener or load binder. This patent discloses a leverage bar or extension with one end having a means for safely engaging the handle of the chain tightener. The end of the extension has plates to engage the handle bulge and prevent it from slipping.

U.S. Pat. No. 3,843,981 to Verest discloses a tool for truck operators. This tool includes use as a load binder extension handle.

U.S. Pat. No. 4,644,600 to Fugate teaches an extension handle for wrenches which has stirrups for engaging a wrench.

U.S. Pat. No. 4,873,742 to Dillon teaches a safety tie down bar hand grip for use with a ratchet with one end having an angular shape. Additionally this patent discloses a stop member and a flange (or lip). The safety tie down bar does not have, however, a flared end which prevents slippage of the handle from the ratchet assembly. End cap of the safety tie down bar is removable and formed from an elastomeric or synthetic material.

None of the foregoing teach the particular apparatus and/or method of the present invention.

SUMMARY OF THE INVENTION

The present invention accomplishes its desired objects by broadly providing an improved leverage bar for operating a load binder or a ratcheting binder, such as would be installed on a flat bed of a trailer. The improved leverage bar comprises an elongated bar member with a first end secured to a latch assembly for providing additional leverage to a load binder or chain tightener. A second end is secured to a rod assembly for engaging an opening of a ratcheting binder. The latch assembly comprises a generally U-shaped wall assembly having a pair of opposed wall members secured to opposite ends of a semi-circular wall member. A latch member is interposed between the opposed wall members and a fulcrum member is interposed between the opposed wall members. A rod assembly is secured to the second end of the bar member for engaging the opening of the ratcheting binder. The rod assembly comprises a first cylindrical section having a first diameter secured to the second end of the bar member. A second cylindrical section having a second diameter is secured to the first cylindrical section, and an end cap member is secured to the second cylindrical section.

The present invention further accomplishes its desired objects by broadly providing a method for securing articles to a bed of a trailer comprising the steps of:

(a) securing a winch member to a bed of a trailer; said winch member being engaged to one end of a belt having its other end affixed with said belt in contact with at least one article supported by the bed and having a cylindrical hub with a first pair of holes diametrically opposed from each and a second pair of holes diametrically opposed from each other and disposed in a spaced arcuate relationship from the first pair of holes on the cylindrical hub at about ninety degrees;

(b) providing a leverage bar comprising an elongated bar member having a bar axis and a bar diameter, and a rod assembly secured to the elongated bar and having a rod assembly axis that is angularly disposed from approximately 15.0 degrees to about 30.0 degrees from the bar axis;

(c) grasping the elongated bar member and inserting the rod assembly through the first pair of holes;

(d) rotating the cylindrical hub of the winch with the elongated bar member from about 35 degrees to about 55 degrees, which causes the winch to take-up the belt and tighten the belt against the article;

(e) rotating the elongated bar member about 180 degrees;

(f) rotating the cylindrical hub of the winch with the elongated bar member from about 35 degrees to about 55 degrees;

(g) removing the rod assembly from the first pair of holes and inserting the rod assembly into the second pair of holes;

(h) repeating steps (d)-(f);

(i) removing the rod assembly from the second pair of holes and inserting the rod assembly into the first pair of holes; and (j) repeating steps (d)-(i) until the belt is sufficiently tight against the article.

It is therefore an object of the present invention to provide an improved leverage bar.

It is another object of the present invention to provide a method for securing articles to a bed of a trailer.

These, together with the various ancillary objects and features which will become apparent to those skilled in the art as the following description proceeds, are attained by this improved leverage bar and method, a preferred embodiment as shown with reference to the accompanying drawings, by way of example only, wherein;

DETAILED DESCRIPTION OF THE INVENTION

Figure 1:
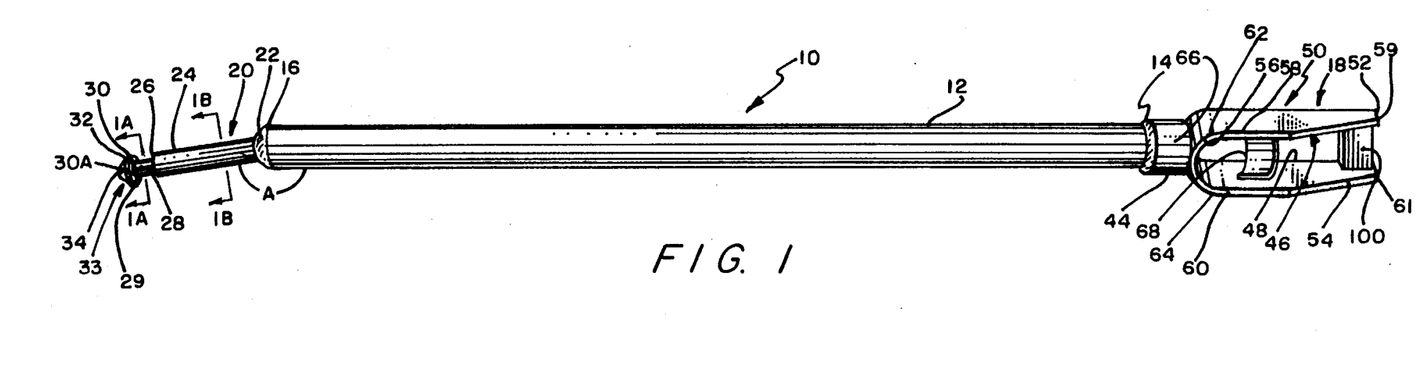
FIG. 1 is a perspective view of the leverage bar of the invention having a latch assembly on a first end and a rod assembly on a second end.

Referring now to the drawings wherein similar parts of the invention are identified by like reference numerals, there is seen, as shown in FIG. 1, a preferred embodiment of the improved trucker's leverage bar of the invention, generally illustrated as 10. In the embodiment of FIG. 1, the improved leverage bar 10 comprises a generally cylindrical handle or bar member 12 having one end 14 secured to a latch assembly 18 and another end 16 secured to a rod assembly 20. It is to be understood that the improved leverage bar may have the latch assembly 18 secured to the bar 12 without a corresponding connection (to the bar 12) and/or use of the rod assembly 20. Similarly the rod assembly 20 may be utilized with bar 12 without a corresponding connection (to the bar 12) and/or use of latch assembly 18. Such a selected use of either the latch assembly 18 or rod assembly 20 does not depart from the spirit and/or scope of the invention. However, a salient feature of the invention is the combination of the latch assembly 18 and the rod assembly 20, both secured to bar 12. The embodiment shown in FIG. 1 discloses a preferred embodiment of the leverage bar 10 having both the latch assembly 18 and the rod assembly 20 as being integrally fashioned from bar member 12. The rod assembly 20 is used to engage a ratchet binder or winch for providing leverage thereto, and the latch assembly 18 is used to engage the handle of a load binder and to provide additional leverage thereto.

Figure 1A:
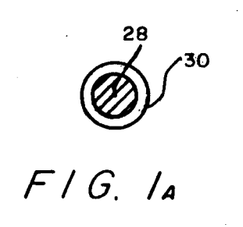
FIG. 1A is a vertical sectional view of a second cylindrical section taken in direction of the arrows and along the plane of line 1A—1A in FIG. 1.
Figure 1B:
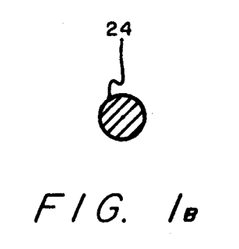
FIG. 1B is a cross sectional view of a first cylindrical section of the rod assembly taken in direction of the arrows and along the plane of line 1B—1B in FIG. 1.
Figure 1C:
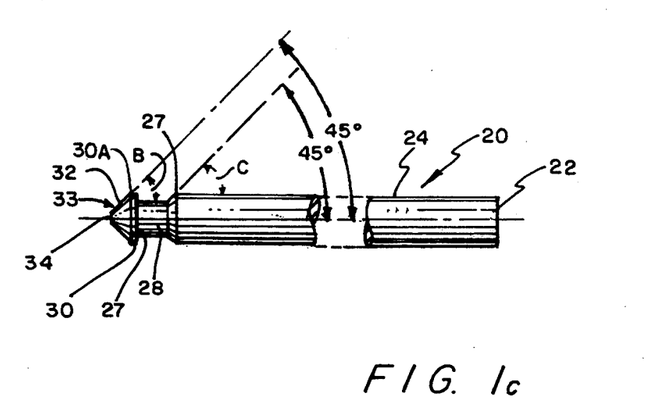
FIG. 1C is a top plan view of the rod assembly disclosing the end cap member, the second cylindrical section, a collar member, and the first cylindrical section.

As previously mentioned, bar 12 has end 16 secured to the rod assembly 20. The rod assembly 20 comprises an elongated generally cylindrical first section 24 having a first end 22 and a second end 26 (refer to FIG. 1). The first end 22 is secured to the end 16 of the bar or handle member 12, and the second end 26 comprises a structure wherein a second generally cylindrical section 28 is formed therefrom. The second end, as shown in FIG. 1c, comprises a beveled surface 27 (or angular protrusion 27) formed or machined therearound and has a surface that forms an angle C with a horizontal plane. Stated alternatively, the beveled surface 27 has a structure that is generally ring-shaped having one edge that is angularly disposed. Angle C, in a preferred embodiment is from about 30 degrees to about 60 degrees. More preferably, the angle C is about 45 degrees. The beveled surface 27 (or angular protrusion 27) provides additional strength to the rod assembly 20 to prevent the rod assembly 20 from being severed from the bar member 12 under stress.

The second generally cylindrical section 28, as shown in FIG. 1 comprises a length which is preferably, although not exclusively, shorter than the first cylindrical section 24. In the preferred embodiment depicted by FIG. 1, the second cylindrical section 28 comprises a length that is generally shorter than the first cylindrical section 24. It is to be understood however that the first cylindrical section 24 may be shorter in length than that of the second cylindrical section without departing from the spirit and/or scope of the invention. The second cylindrical section 28 further comprises a cross sectional diameter, as shown in FIG. 1a, which is generally smaller than the cross sectional diameter of the first generally cylindrical section 24.

Figure 2:
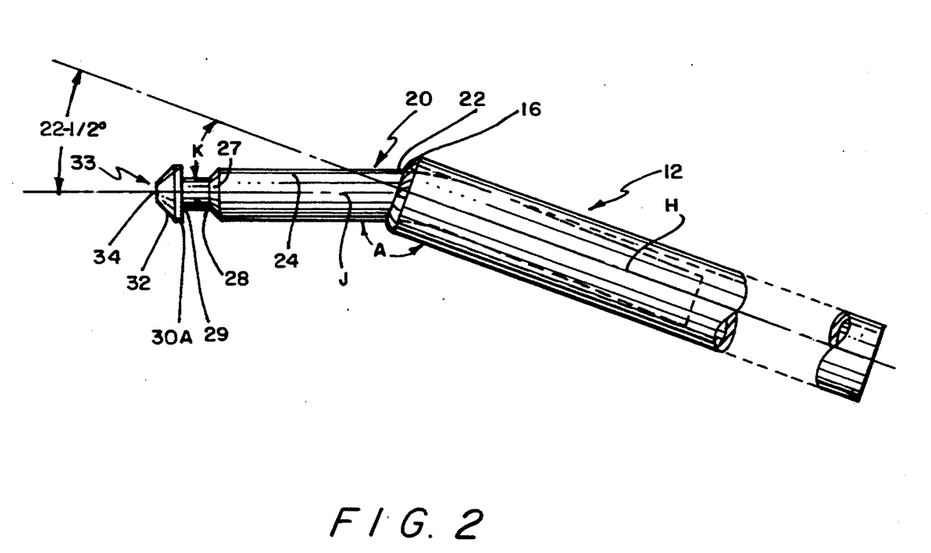
FIG. 2 is a side elevational view of the rod assembly as secured to the leverage bar.
Figure 7:
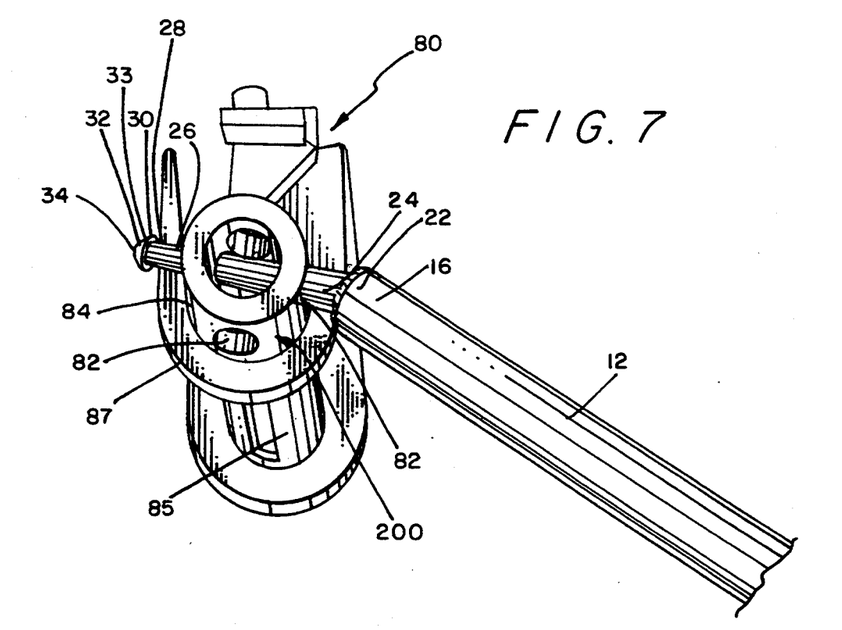
FIG. 7 is a perspective view of the rod assembly of the leverage bar disposed in openings of a ratchet binder.
Figure 8:
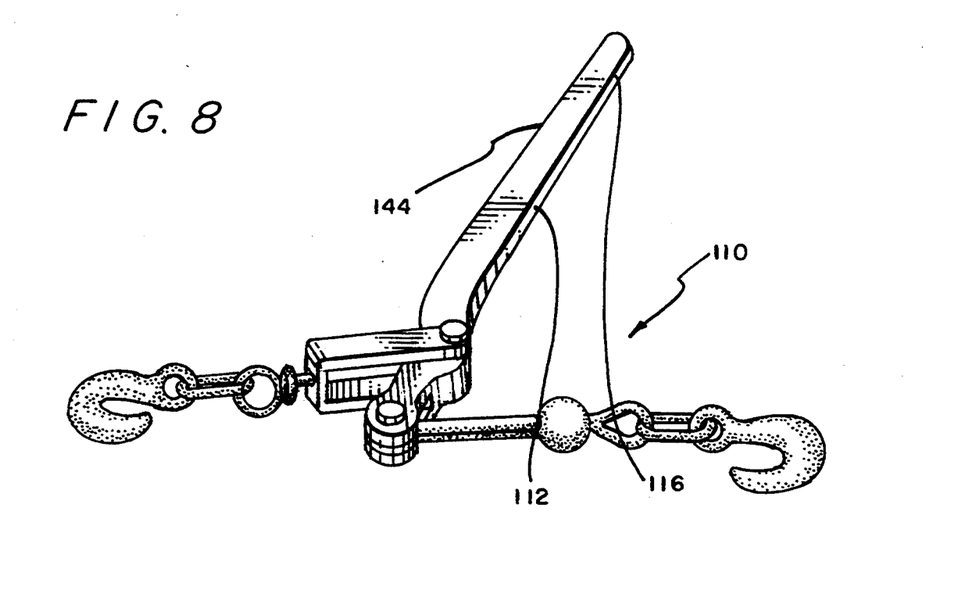
FIG. 8 is a perspective view of the load binder.

An end cap member, generally illustrated as 33, is secured to an end 29 of the second cylindrical section 28. The end cap member 33 defines a structure comprising a generally conical shape. The end cap (see FIGS. 1C and 2) comprises a first circular end 30, a conical section 32 that terminates in a second circular end 34 wherein the second circular end 34 is smaller than the first circular end 30 (see FIG. 1). The second circular end 34 is the small end or small diameter of the conical section 32 and the first circular end 30 is the large end or larger diameter of the conical section 32. The first circular end 30 of the end cap member 33 is larger in diameter than the second cylindrical section 28. Usually, in the manufacturing process, the first circular end 30 of the end cap member 33 comprise about the same diametrical measure as the first cylindrical section 24. The difference in diameter of the first circular end 30 and the second cylindrical section 28 is one of the salient features of the invention. As shown in FIG. 7, as the rod assembly 20 is inserted into a pair of diametrical openings 82—82 of a binder ratchet 80, the second circular end 34 and the conical section 32 help guide the rod assembly 20. Typically the ratchet 80 has two (2) pairs of diametrical openings 82—82 (a total of four openings 82—82—82—82) on a cylindrical hub 200. Likewise, the angular protrusion 27 helps guide the rod assembly 20 into the opening 82. It is to be understood that the first cylindrical section 24 is intended to be fully engaged to the ratchet binder 80. Stated alternatively, the rod assembly 20 is inserted into opening 82 such that the rod assembly 20 passes therethrough and passes through another opening 82 opposed to opening 82. In the usual use of the invention, the first cylindrical section 24 is engaged to and through both openings 82—82. Once inserted, the first circular end 30 of the end cap member 33 helps prevent the rod assembly 20 from easily slipping from the opening 82, by catching or abutting an edge 30a of the first circular end 30 against an inside of a wall 84 of the cylindrical hub 200 surrounding the opening 82. The smaller diameter allows the second section 28 to act as a stopping mechanism or safety mechanism when the rod assembly 20 is used to engage a ratchet means. Thus, the smaller diameter of the second cylindrical section 28 (as compared to the first circular end 30 and the first cylindrical section 24) is such to prevent the rod assembly 20 from accidentally slipping from the ratchet 80 during use. The conical section 32 of the end cap member 33 comprises an angle B, as best shown in FIG. 1c. Angle B, in a preferred embodiment ranges from about 30 degrees to about 60 degrees. More preferably, angle B measures about 45 degrees.

As further shown in FIGS. 1 and 7, the first cylindrical section 24 is secured to the handle or bar member 12 such that an angle A is formed thereby. Angle A, in a preferred embodiment comprises from about 170 degrees to about 120 degrees. More preferably, and with reference to the drawing in FIG. 2, the angle A is about 150–160 degrees. Stated alternatively and in a preferred embodiment of the invention, the bar member 12 has an axis H and the rod assembly 20 has an axis J (see FIG. 2) which forms an angle K with axis H. Angle K preferably ranges from about 10 degrees to about 60 degrees, more preferably from about 15 degrees to about 30 degrees, and most preferably about 22.5 degrees. The angular disposition of the rod assembly 20 relative to the bar or handle member 12 allows the user to rotate the bar 12 (e.g. 180 degrees) while it is inserted in the ratchet (as in FIG. 7) to achieve more leverage, as the binder ratchet 80 is usually situated in a position such that generally no more than one opening 82 is accessible at a time.

Referring now to FIGS. 3A–3D, the latch assembly 18 of the invention is seen. The latch assembly comprises a generally U-shaped wall assembly 50 having a first opposed wall member 52, a second opposed wall member 54 and a semi-circular end wall member 56 interconnecting the opposed wall members 52-54. The first opposed wall member comprises a first end 58 secured to a first end 62 of the semi circular wall 56, and the second opposed wall, likewise, comprises a first end 60 secured to a second end 64 of the semi-circular wall member 56 to form the generally U-shaped wall assembly 50. Wall members 52 and 54 respectively have bottom edges 52b and 54b, and upper edges 52a and 54a which are parallel to bottom edges 526 and 546.

Figure 3A:
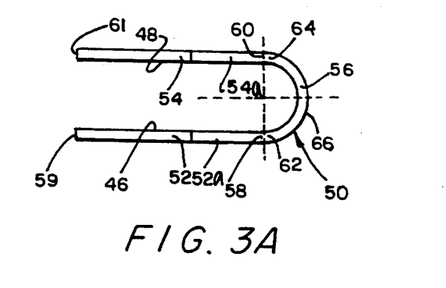
FIG. 3A is a top plan view of a wall assembly of the latch assembly.
Figure 3B:
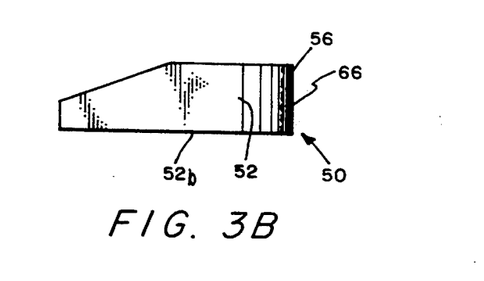
FIG. 3B is a side elevational view of the wall assembly of FIG. 3A.
Figure 3C:
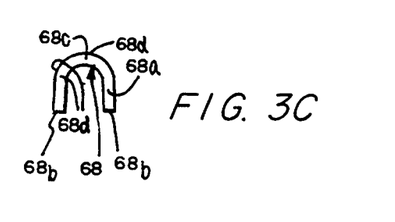
FIG. 3C is a side elevational view of a latch member of the latch assembly.
Figure 3D:
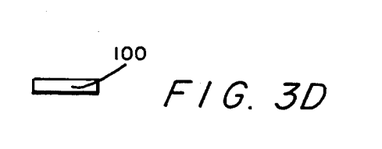
FIG. 3D is a side elevational view of a fulcrum member of the latch assembly.

The generally U-shaped wall assembly 50 has an outside edge 66 secured to end 16 of the handle or bar member 12 such that the opposed wall members 52-54 are generally situated along the same plane or parallel as or to the bar member 12. A collar member 44 is secured around the end 16 of the bar member 12 to increase the surface area of the joint between the outside edge 66 of the wall assembly 50 and the bar 12. Use of the collar member 44 increases the amount force that may be applied to the bar without breaking the joint between the end 16 and the outside edge 66. In one preferred embodiment the opposed side wall members 52-54, as shown in FIG. 3b, comprise a structure defining a triangular cut-out to provide easier access for a handle 112 of a load binder 110 (see FIG. 3b). A latch member 68 is interposed between the first and second opposed wall members 52-54 for engaging the handle 112. The latch member 68 defines a structure comprising a generally U-shaped structure.

Figure 4A:
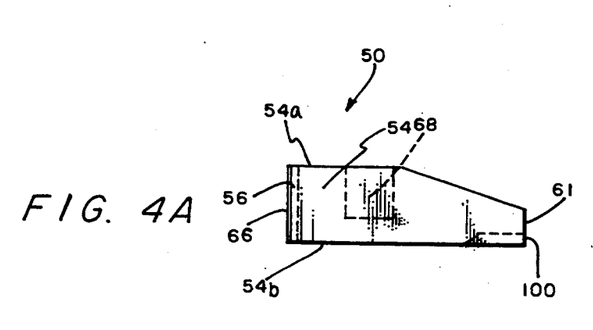
FIG. 4A is a side elevational view of the latch assembly with the latch member and the fulcrum member depicted by dashed lines.
Figure 4B:
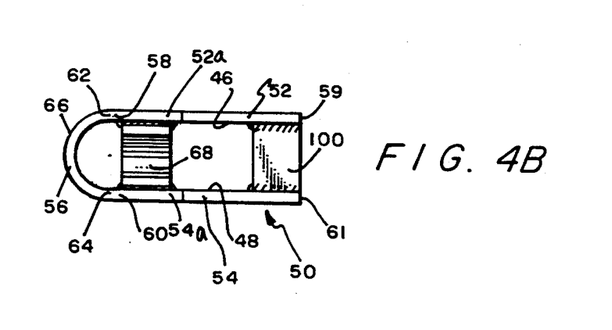
FIG. 4B is a top plan view of the latch assembly of FIG. 4A
Figure 4C:
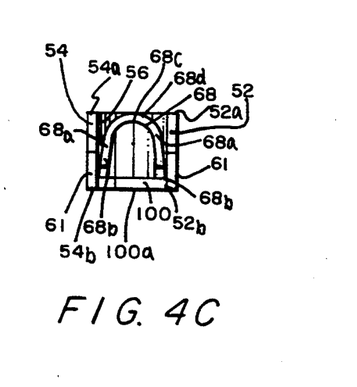
FIG. 4C is a front elevational view of the latch assembly of FIG. 4A.
Figure 5:
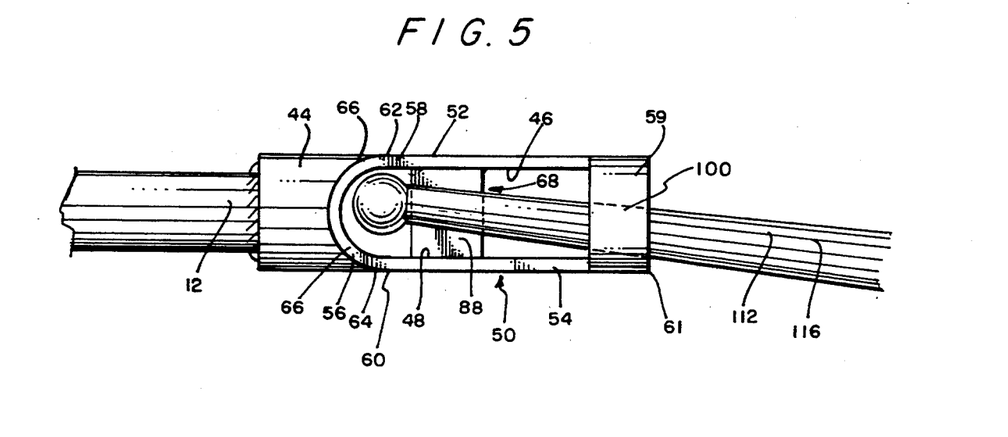
FIG. 5 is a bottom perspective view of the latch assembly of the leverage bar coupled to a handle of a load binder.
Figure 6:
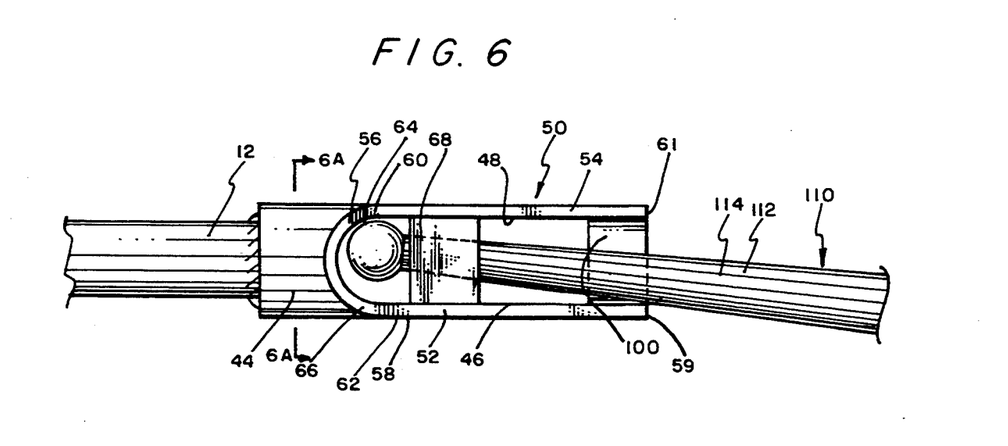
FIG. 6 is a top perspective view of the latch assembly of the leverage bar coupled to the handle of the load binder of FIG. 7.
Figure 6A:
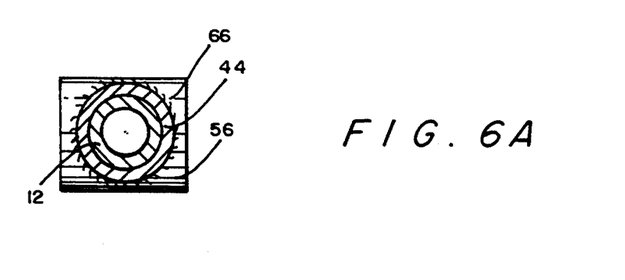
FIG. 6A is a vertical sectional view taken in direction of the arrows and along the plane of line 6A—6A in FIG. 6.

With a pair of arms 68a—68a, each terminating in an end 68b—68b, integrally formed with arcuate body 68c having an outside extreme point aligning with the top edges 52a and 54a (see FIG. 4c). The ends 68b—68b are spaced more than 0.50 inches from the bottom edges 52b and 54b. Stated alternatively, the ends 68b—68b (as shown in FIG. 4c) discontinue along walls 61—61 above the top of a fulcrum member 100.

As previously mentioned, the latch member 68 is secured to and interposed between the first and second generally opposed wall members 52-54 (see FIGS. 4A-4C). The first and second generally opposed wall members 52-54 further comprise respective second ends 59-61 thereof. The fulcrum member 100 is secured to and interposed between the first and second generally opposed wall members 52-54 such that the fulcrum member 100 is secured along a bottom edge 88 of the generally U-shaped wall assembly 50 and proximal to second ends 59-61 (refer to FIG. 4A). The fulcrum member 100 has an outside surface 100a that is aligned with the bottom edges 52b and 54b (see FIG. 4c). The fulcrum member 100 and the latch member 68 are preferably welded to the latch assembly 18, but it is to be understood that any manufacturing means applicable may be used to secure the latch member 68 and the fulcrum member 100 to the latch assembly 18, such as forming the entire latch assembly 18 from an iron molding process without departing from the spirit and/or scope of the invention.

Continuing to refer to the drawings for the operation of the invention, a binder ratchet 80 is provided, as shown in FIG. 7. The rod assembly 20 of the leverage bar 10 is inserted into opening 82 of the binder ratchet 80 such that the end cap member 33 passes through another opening 82, which is opposedly situated from opening 82. The bar member 12 is angularly disposed relative to the rod assembly 20, such that, as previously mentioned, an offset angle of about 22.5 degrees is achieved. As the ratchet binder 80 is operated to coil up a strap 300, by rotating the ratchet binder 80 with the leverage bar 10, the handle or bar member 12 may be rotated within the opening 82. By such rotation, additional leverage may be achieved as the bar member 12 is inclined upwards via the angular offset of the rod assembly 20 seated in the opening 82 relative to the bar member 12. A salient feature of the rod assembly 20 is the smaller diameter second cylindrical section 28 (see FIG. 7). If the rod assembly 20 is pulled from the opening 82 slightly, the outside wall 84 of the ratchet opening 82 catches the end cap member 33 and prevents the rod assembly 20 from accidentally slipping from the ratchet binder 80. Further, as force is supplied to the leverage bar 10 when tightening the ratchet binder 80, the angular protrusion 27 or beveled surface 27 provides additional support to prevent the rod assembly 20 from separating from the bar member 12.

Figure 9:
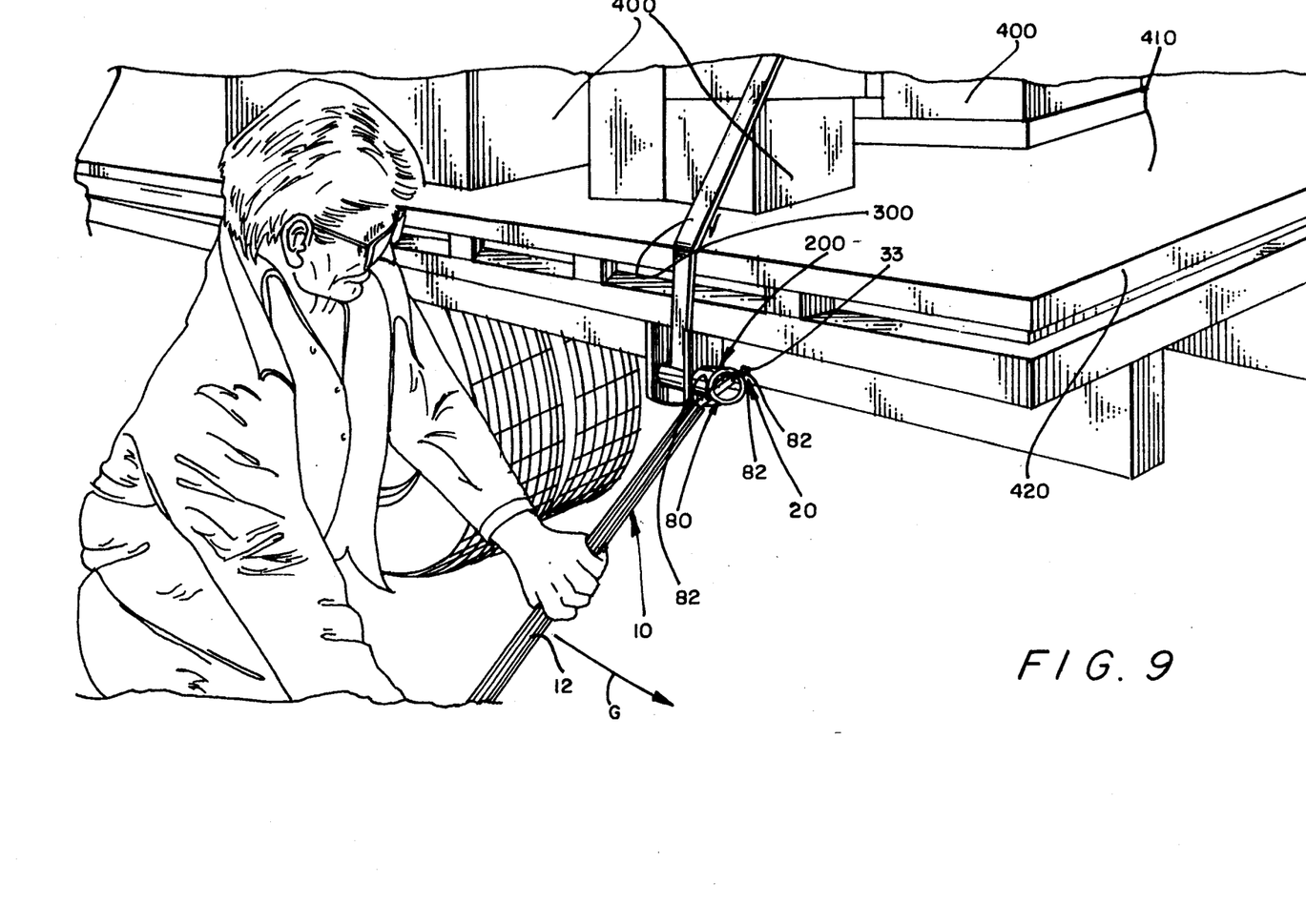
FIG. 9 is a perspective view of the rod assembly of the leverage bar in use to operate the ratchet binder.
Figure 10:
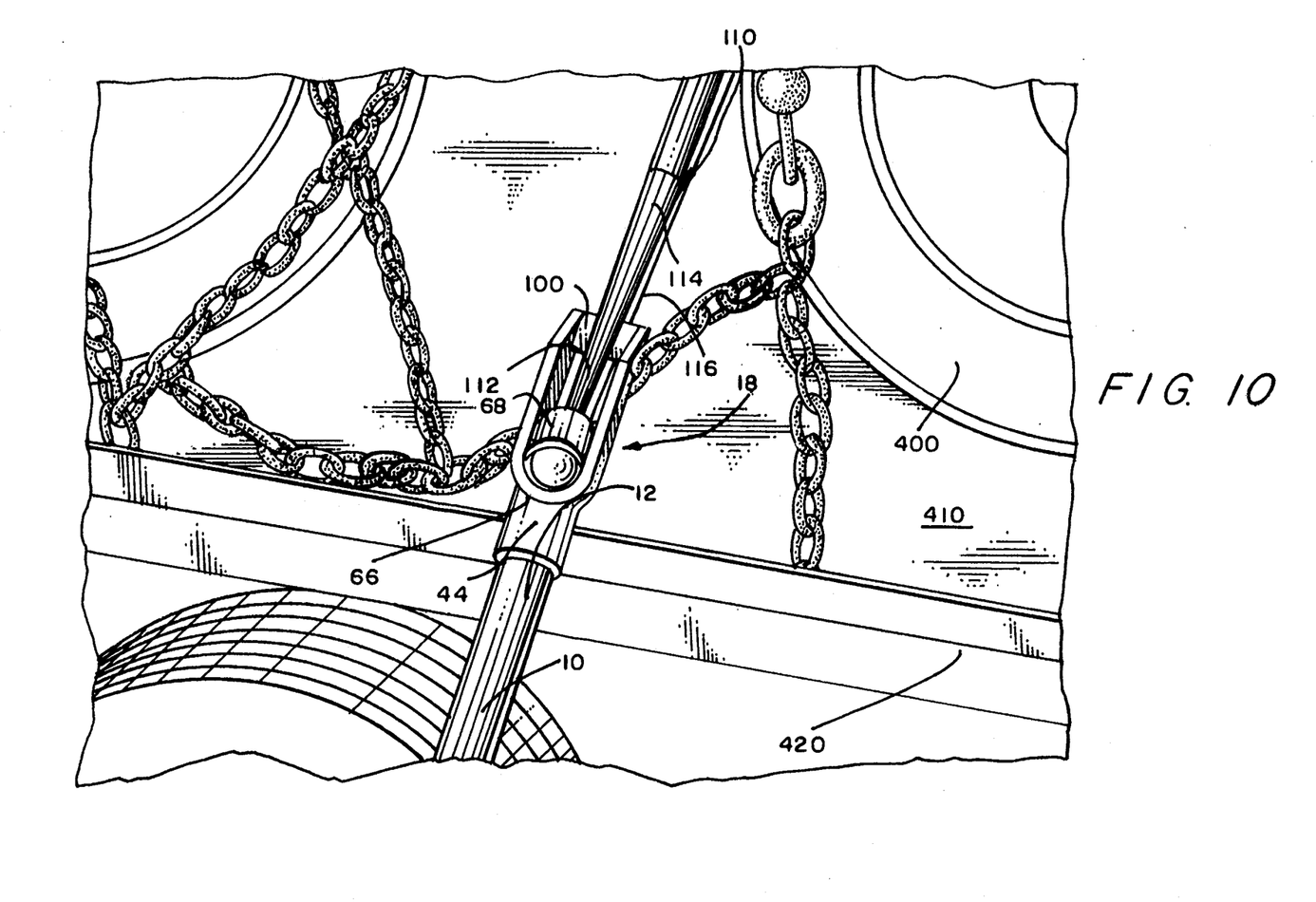
FIG. 10 is a perspective view of the latch assembly of the leverage bar engaged to the handle of the load binder to provide additional leverage thereto.
Figure 11:
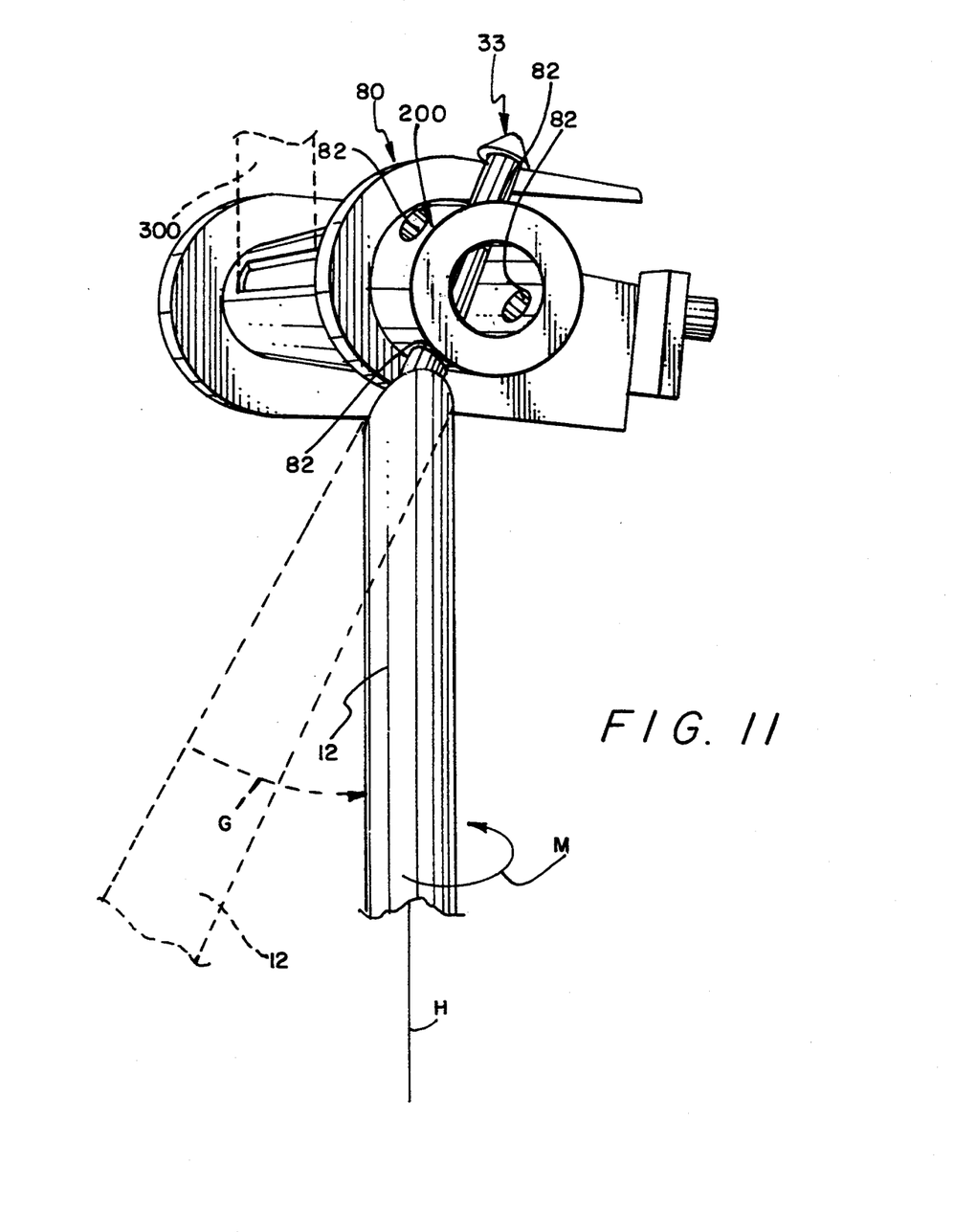
FIG. 11 is another perspective view of the rod assembly of the leverage bar in use to operate the winch or ratchet binder and after rotating the cylindrical hub of the winch about 45 degrees.
Figure 12:
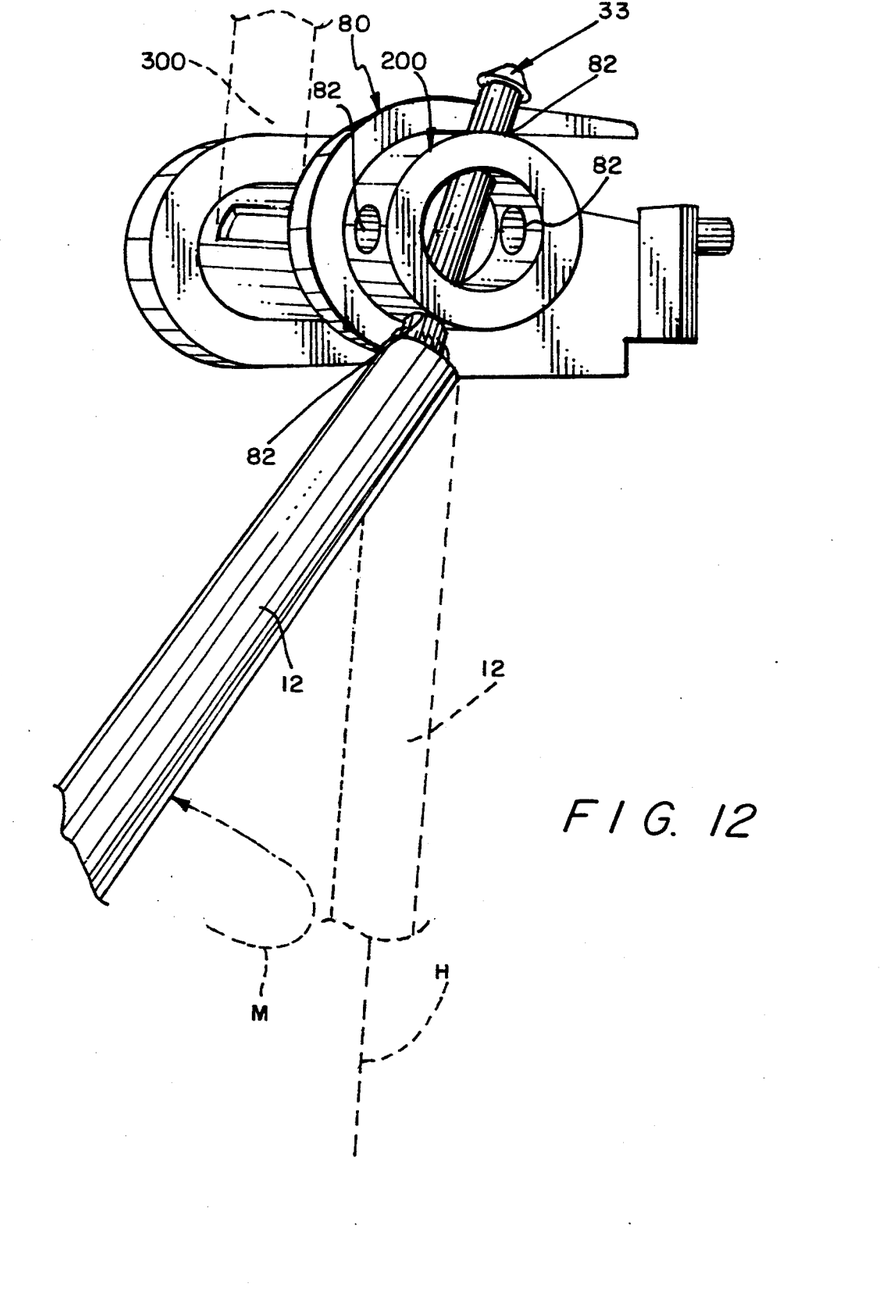
FIG. 12 is a perspective view of the rod assembly of the leverage bar in use to operate the winch or ratchet binder and after rotating the cylindrical hub of the winch about 45 degrees and further after rotating the handle bar about 180 degrees to position the leverage bar to move the cylindrical hub of the winch another about 45 degrees.

Referring now to FIGS. 9 and 11-12 for operation of a method for securing articles 400 to a bed 410 of a trailer 420, the ratcheting type winch member 80 is secured to the bed 410 of the trailer 420. The winch member 80 is engaged to the belt 300 for taking-up the same to rigidly retain and maintain the articles 400 on the bed 410 of the trailer 420. The other end (not shown) of the belt 300 is affixed (such as to the other side of the bed 410 and/or to an article 400, etc.) and is typically trained over articles 400 (or otherwise to be placed in bias contact). As previously indicated, the winch member 80 has the cylindrical hub 200 with the four (4) holes 82—82—82—82, each spaced about 90 degrees from two contiguous holes 82—82 such that diametrically opposed holes 82—82 are aligned. The leverage bar 10 is grasped at the handle or bar member 12 and the rod assembly 20 is inserted through a pair of diametrically opposed holes 82 (see FIG. 9). The bar member 12 is subsequently depressed downwardly in direction of the arrow G in FIG. 9, which causes the cylindrical hub 200 to rotate typically from about 35 degrees to about 55 degrees and cause the winch 80 to take up the belt 300 and commence tightening the belt 300 against the articles 400. After the bar member 12 has been subsequently depressed in direction of the arrow G and the cylindrical hub 200 has been rotated 35 degrees to 55 degrees, the leverage bar 10/winch 80 would be in the position depicted in FIG. 11. The bar member 12 is subsequently rotated about its axis H and in direction of the arrow M (see FIG. 11), preferably about 180 degrees or until the bar member 12 has reached the posture in FIG. 12. The cylindrical hub 200 may now be rotated again another 35-55 degrees without the necessity of having to remove the rod assembly 20 from the initial pair of diametrically opposed holes 82. After the second rotation of the cylindrical hub 200 of another 35-55 degrees, the rod assembly 20 is removed from the initial pair of diametrically opposed holes 82—82 and is subsequently inserted into a second pair of diametrically opposed holes 82—82 and the foregoing steps and procedures are repeated while the rod assembly 20 is in the second pair of diametrically opposed holes 82—82. After the repetition, the rod assembly 20 may be removed from the second pair of diametrically opposed holes 82—82 and reinserted into the initial pair of diametrically opposed holes 82—82 for repeating the steps and procedures. All steps and procedures may be repeated until the belt 300 is sufficiently tight against the article 400.

In a similar fashion, the latch assembly 18 is secured to the bar member 12 for engaging a load binder 110. As shown in FIGS. 5, 6, 8, and 10, the latch assembly 18 is slipped onto a handle 112 of the load binder 110. The handle 112 of the load binder 110 is engaged by the latch assembly 18 such that the U-shaped latch member 68 engages a top 114 of the handle 112 of the load binder 110 and the fulcrum member 100 engages a bottom 116 of the handle 112. As downward force is applied to the leverage bar 10 and to the load binder handle 112, the fulcrum member 110 transmits the force to the latch member 68 and to the handle 112 of the load binder 110, thereby providing increased leverage for operating the load binder 110. Once the load binder 110 is in a tightened position, the leverage bar 10 may be easily removed from the handle 112 of the load binder 110 by lifting it in the opposite direction (from the direction of the force applied in tightening the load binder 110) such that the latch member 68 is disengaged from the top 114 of the handle 112. The leverage bar 10 may then be slidably removed from the load binder handle 112.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A leverage bar for operating a ratcheting load binder comprising an elongated bar member having a bar axis and a bar diameter; a rod assembly secured to the elongated bar member for engaging an opening of a racheting load binder; said rod assembly having a rod assembly axis and comprising a first cylindrical section having a first diameter and secured to said bar member, a second cylindrical section having a second diameter and secured to said first cylindrical section, and an end cap member secured to said second cylindrical section; said end cap member comprising a first circular end having a first end diameter and secured to said second cylindrical section, and a conical section secured to said first circular end and terminating in a second circular end having second end diameter; and a latch assembly for engaging a handle of said load binder and secured to an end of said elongated bar member; and said second cylindrical section comprises a collar member secured thereto; said collar member comprising a structure that is ring-shaped; said second diameter of said second cylindrical section being smaller than said first diameter of said first cylindrical section; and wherein said latch assembly comprises a pair of opposed wall members having a pair of top edges respectively and a pair of bottom edges respectively; and wherein said bar axis has an axis angle ranging from about 15 degrees to about 30 degrees relative to said rod axis; and wherein said latch assembly additionally comprises an end wall member secured to said pair of opposed wall members and secured to said end of said elongated bar member; a generally U-shaped latch member secured to and interposed between said opposed wall members, and a fulcrum member secured to and interposed between said pair of opposed wall members; said latch member further comprising an arcuate bottom having an extreme point aligned with the top edges of the wall members.

2. The leverage bar of claim 1 wherein said bar axis has an axis angle of about 22.5 degrees relative to said rod axis.

3. The leverage bar of claim 1 wherein said conical section has a conical sloping surface and said first cylindrical section has a structure defining a beveled surface such that a conical plane along the conical sloping surface is generally parallel to a bevel plane along the beveled surface.

4. The leverage bar of claim 3 wherein said second end diameter is less than said first end diameter.

5. The leverage bar of claim 1 wherein said conical section has a conical sloping surface and said collar member has a collar sloping surface such that a conical plane along the conical sloping surface is generally parallel to a collar plane along the collar sloping surface.

6. The leverage bar of claim 5 wherein said second end diameter is less than said first end diameter.

7. A leverage bar for operating a load binder comprising an elongated bar member and a latch assembly for engaging a handle of a load binder and secured to an end of said elongated bar member; said latch assembly comprising a pair of opposed wall members having a pair of top edges respectively and a pair of bottom edges respectively, an end wall member secured to said pair of opposed wall members and secured to said end of said elongated bar member; a generally U-shaped latch member secured to and interposed between said opposed wall members, and a fulcrum member secured to and interposed between said pair of opposed wall members; and said generally U-shaped latch member comprising a structure having a pair of latch arms secured to the opposed wall members and terminating in a pair of latch arm ends and said structure of said generally U-shaped latch member further having an arcuate bottom having an outside arcuate bottom surface having an extreme point aligned with the top edges of the wall members.

8. The improved leverage bar of claim 7 additionally comprising a collar member secured around said end of said elongated bar member and additionally having a collar end secured to said latch assembly for providing increased strength thereto.

9. The leverage bar of claim 8 wherein said latch arm ends are situated over 0.50 inches from said bottom edges of said opposed wall members.

10. The leverage bar of claim 7 wherein said latch arm ends are situated over 0.50 inches from said bottom edges of said opposed wall members.

11. The leverage bar of claim 10 wherein said fulcrum member has an outside fulcrum surface that is generally aligned with said bottom edges of said opposed wall members.

12. The leverage bar of claim 11 wherein said end wall member is generally semi-circular.

13. The leverage bar of claim 7 wherein said fulcrum member has an outside fulcrum surface that is generally aligned with said bottom edges of said opposed wall members.

14. The leverage bar of claim 13 wherein said end wall member is generally semi-circular.

15. The leverage bar of claim 7 wherein said elongated bar member has a bar axis and a bar diameter; and said leverage bar additionally comprises a rod assembly secured to the elongated bar member for engaging an opening of the load binder; said rod assembly having a rod assembly axis and comprising a first cylindrical section having a first diameter and secured to elongated bar member, a second cylindrical section having a second diameter and secured to said first cylindrical section, and an end cap member secured to said second cylindrical section.

16. The leverage bar of claim 15 wherein said end cap member comprising a first circular end having a first end diameter and secured to said second cylindrical section, and a conical section secured to said first circular end and terminating in a second circular end having second end diameter.

17. The leverage bar of claim 16 wherein said second diameter of said second cylindrical section being smaller than said first diameter of said first cylindrical section; and said bar axis has an axis angle ranging from about 15 degrees to about 30 degrees; and said conical section has a conical sloping surface and said first cylindrical section has a structure defining a beveled surface such that a conical plane along the conical sloping surface is generally parallel to a bevel plane along the beveled surface; and said second end diameter is less than said first end diameter.

18. A method for securing articles to a bed of a trailer comprising the steps of:
(a) securing a winch member to a bed of a trailer; said winch member being engaged to one end of a belt having its other end affixed and with said belt in contact with at least one article supported by the bed and having a cylindrical hub with a first pair of holes diametrically opposed from each and a second pair of holes diametrically opposed from each other and disposed in a spaced arcuate relationship from the first pair of holes on the cylindrical hub at about ninety degrees;
(b) providing a leverage bar comprising an elongated bar member having a bar axis and a bar diameter, and a rod assembly secured to the elongated bar and having a rod assembly axis that is angularly disposed from approximately 15.0 degrees to about 30.0 degrees from the bar axis;
(c) grasping the elongated bar member and inserting the rod assembly through the first pair of holes;
(d) rotating the cylindrical hub of the winch with the elongated bar member from about 35 degrees to about 55 degrees, which causes the winch to take-up the belt and tighten the belt against the article;
(e) rotating the elongated bar member about 180 degrees;
(f) rotating the cylindrical hub of the winch with the elongated bar member from about 35 degrees to about 55 degrees;
(g) removing the rod assembly from the first pair of holes and inserting the rod assembly into the second pair of holes;
(h) repeating steps (d)–(f);
(i) removing the rod assembly from the second pair of holes and inserting the rod assembly into the first pair of holes; and
(j) repeating steps (d)–(i) until the belt is sufficiently tight against the article.

* * * * *